Sept. 3, 1963  H. M. GEYER  3,102,437
ELECTROMECHANICAL ACTUATOR
Filed Nov. 23, 1960
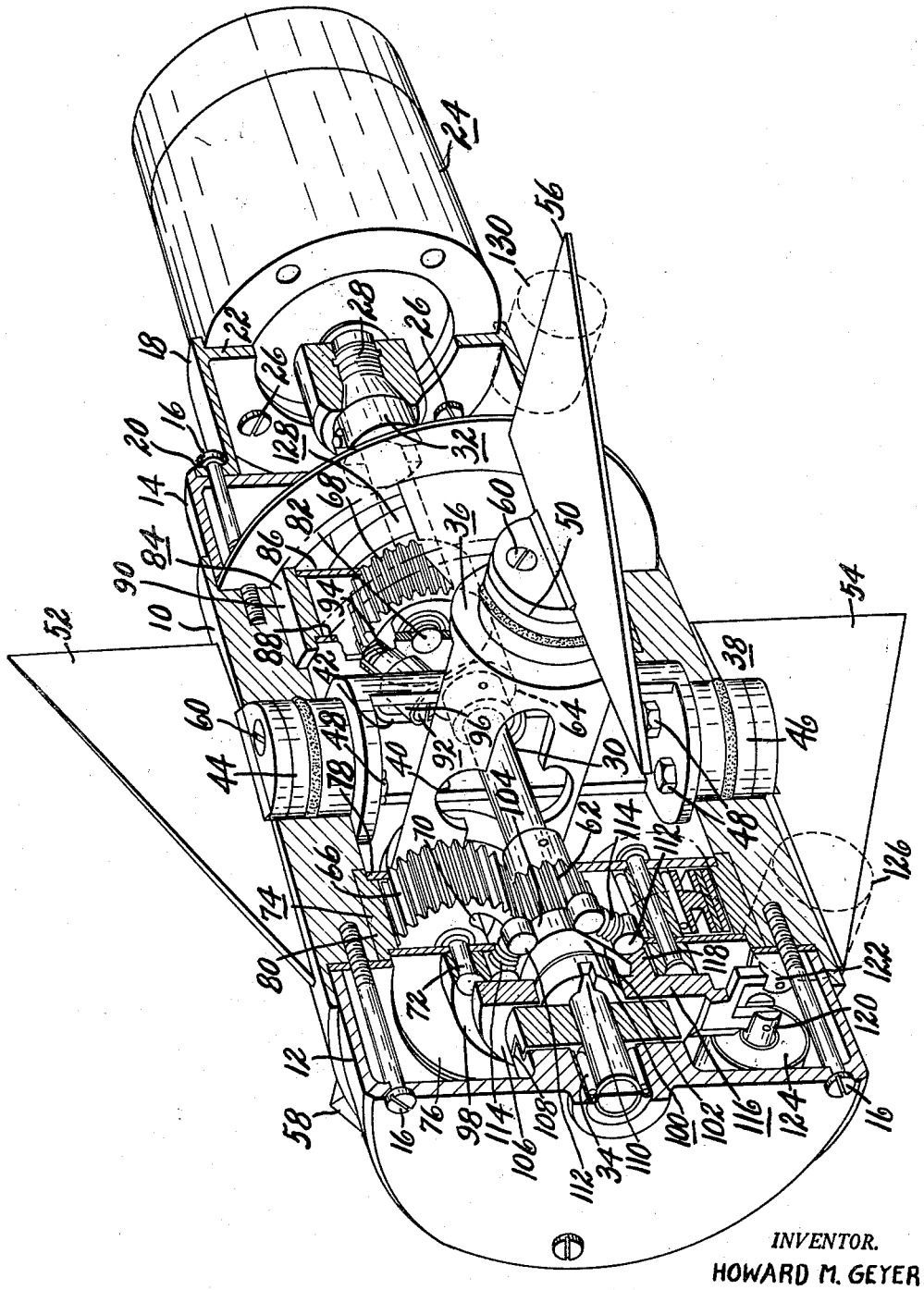
INVENTOR.
HOWARD M. GEYER
BY
*W. E. Finken*
HIS ATTORNEY

United States Patent Office 3,102,437
Patented Sept. 3, 1963

3,102,437
ELECTROMECHANICAL ACTUATOR
Howard M. Geyer, Dayton, Ohio, assignor to General Motors Corporation, Detroit, Mich., a corporation of Delaware
Filed Nov. 23, 1960, Ser. No. 71,297
8 Claims. (Cl. 74—752)

This invention pertains to actuators, and particularly to an improved actuator of the electromechanical type utilizing the mass inertia principle.

At the present time the control mechanisms for positioning aerodynamic control surfaces of a missile during flight thereof are unduly complex and require a relatively large amount of power to operate. This invention relates to relatively simple and compact control mechanism for positioning the aerodynamic control surfaces of a missile in which a relatively small unidirectional electric motor is continuously operated, the rotation of the motor being converted into torque impulses in opposite directions through eccentrically weighted masses, in combination with means for transmitting the torque impulses in only one direction at a time to the control surfaces. Accordingly, among my objects are the provision of an improved electromechanical actuator for operating the aerodynamic control surface of a missile; the further provision of an improved electromechanical actuator of the mass inertia type including bidirectional roller no-back means for selecting the direction of rotation imparted to an output member; and the still further provision of an improved actuator assembly of the aforesaid type including a pair of output shafts arranged perpendicularly to each other including means for driving the output shafts alone or simultaneously in either direction.

The aforementioned and other objects are accomplished in the present invention by driving a pair of spaced planet gear sets having eccentrically weighted planet gears from a single unidirectional electric motor and including a pair of bidirectional roller no-backs for selecting the direction of rotation imparted to the output members. Specifically, the improved electromechanical actuator is designed for operating the four aerodynamic control surfaces of a missile, the control surfaces being attached to opposite ends of shafts located at right angles to each other. The entire mechanism is enclosed in a substantially cylindrical housing having a unidirectional electric motor attached to one end thereof. The motor rotates a shaft extending through the cylindrical housing and has a pair of spaced sun gears drivingly connected thereto. The cross shafts are arranged between the two sun gears and incorporated suitable slots through which the motor driven shaft extends.

Each sun gear is engaged by four planet gears supported by a carrier having a skirt, or annulus, attached thereto. Each planet gear constitutes an eccentric mass, which as disclosed herein is accomplished by forming an arcuate slot in each planet gear. A drive pin connects each planet carrier with one of the output shafts whereby turning moments transmitted to the planet carriers can be transmitted directly to the output shafts.

During rotation of the planet gears, turning moments, or torque impulses, in opposite directions are imparted to the planet carrier during each revolution of each planet gear about its axis. In this manner, substantial torque multiplication is achieved thereby permitting the use of a relatively small continuously operated electric motor.

In order to control the direction of movement of the output shaft, a bidirectional roller no-back is associated with the skirt, or annulus, attached to each planet carrier. Each roller no-back comprises a stationary cam having a plurality of flats on which a pair of rollers are arranged, the rollers being spring biased into wedging engagement with the annulus and the cam so as to preclude movement of the planet carrier in both directions. A release collar is coaxially mounted on the motor driven shaft having a plurality of axially extending fingers disposed between the sets of rollers whereby angular movement of the release collar in opposite directions will release the no-back, or brake means, so as to permit the turning moments, or torque impulses, caused by rotation of the eccentrically weighted planet gears to impart rotation to the planet carrier and hence its output shaft. The direction of movement of each planet carrier and its output shaft is controlled by a pair of oppositely acting, spring centered solenoid means connected with the release collar. When neither solenoid is energized, the bidirectional no-back means prevents movement of its respective planet carrier in both directions thereby locking the output shaft and the control surfaces attached thereto in their adjusted positions.

Further objects and advantages of the present invention will be apparent from the following description, reference being had to the accompanying drawings, wherein a preferred embodiment of the present invention is clearly shown.

In the drawing:

The drawing is a perspective view, partly in section and partly in elevation, with certain parts broken away, of the improved electromechanical actuator constructed according to this invention.

With reference to the drawing, the improved control mechanism includes a cylindrical housing 10, the ends of which are closed by caps 12 and 14 attached thereto by screws 16. An annulus 18 having oppositely extending flanges 20 and 22 adjacent its ends is attached to the cap 14 by the screws 16, the frame of a unidirectional electric motor 24 being attached to the flange 22 by screws 26. The motor 24 includes an output shaft 28 which is connected to the input shaft 30 of the control mechanism through a coupling 32 of the pin and slot type.

The input shaft 30 is journalled by roller bearing means in the end caps 12 and 14, one of the roller bearing means 34 being depicted in the drawing. A pair of cross shafts 36 and 38, constituting the rotary output members, are disposed at right angles to each other in the central part of the cylindrical housing 10. The shafts 36 and 38 are hollow, and each shaft has substantially half of its outer wall portion cut away. The shafts 36 and 38 have cross type slots 40 and 42, respectively, formed in the medial portion of their remaining wall sections, two legs of each cross slot in each shaft being elongated. The input shaft 30 extends through the slots 40 and 42 in the shafts 36 and 38, respectively.

Opposite ends of the shaft 38 are connected to stub shafts 44 and 46 journalled in the housing 10, by means of bolts 48. In a similar manner, opposite ends of the shaft 36 are connected to a pair of stub shafts, only one of which 50 is shown in the drawing. Aerodynamic control surfaces 52, 54, 56 and 58, arranged externally of the cylindrical housing 10, are connected to the stub shafts by screws 60. It is readily apparent that angular movement of the output shaft 36 will turn the control surfaces 56 and 58, whereas angular movement of the output shaft 38 will turn the control surfaces 52 and 54. Angular movement of the control surfaces, and hence the shafts 36 and 38, is limited in both directions by engagement between the edge portions formed by the semicylindrical cutouts in the shafts 36 and 38.

The input shaft 30 has a pair of sun gears 62 and 64 drivingly connected thereto and spaced on opposite sides of the output shafts 36 and 38. The sun gear 62 meshes with four planet gears 66, and the sun gear 64 meshes with four planet gears 68. Each of the planet gears 66 and 68 is formed with an arcuate cutout, such as depicted by numeral 70, on planet gear 66 which subtends an angle of substantially 180° whereby each planet gear constitutes an eccentric mass. The several planet gears are indexed with their respective sun gears so that the slotted portions thereof always have the same relative angular position with respect to their sun gears.

The planet gears 66 are rotatably journalled on stub shafts 72 supported in a planet carrier 74. The planet carrier 74 comprises a pair of spaced plates 76 and 78 interconnected with a ring 80 journalled in the housing 10. The planet gears 68 are journalled on stub shafts 82 supported by a planet carrier 84, likewise comprising spaced plates 86 and 88 interconnected with a ring 90 journalled in the housing 10. The end plate 88 of the carrier 84 has a drive pin 92 connected thereto and extending therefrom. The drive pin 92 has a slotted and threaded end 94 by which it is attached to the plate 88 and a roller portion 96 constituting a cam disposed in one of the elongated legs of the cross type slot 42 of the output shaft 38. In a similar manner, a drive pin, not shown, is connected to the end plate 78 of the carrier 74 and extends into one of the legs of the cross slot 40 in the output shaft 36.

The end plate 76 of the carrier 74 has an annulus 98 attached thereto by the headed ends of the shafts 72. The annulus 98 constitutes one element of bidirectional roller no-back means constituting a double-acting brake for controlling the angular movement of the planet carrier 74. The bidirectional roller no-back means includes a cam 100 having three circumferentially spaced flats 102, with arcuate surfaces 104 arranged therebetween. The cam 100 is rigidly attached to the end cap 12 so as to be restrained against rotation by means of an Oldham coupling including a disk 106 which is keyed at 108 to the cap 12, and keyed at 110 to the cam 100. A pair of rollers 112 are arranged between each flat 102 on the cam 100 and the annulus 98, the rollers 112 being urged apart by coil springs 114 into wedging engagement with both the cam and the annulus 98. In this position, the roller no-back means acts as a brake and precludes rotation of the planet carrier 74 in both directions.

In order to release the no-back means to permit rotation of the planet carrier 74 in one direction or the other, a release collar 116 is journalled on the cam 100. The release collar 116 has three axially extending fingers 118 coaxial with the arcuate portions 104 on the cam 100, and is movable angularly relative to the cam 100 so as to engage either the left or the right hand rollers of the spaced roller sets so as to permit movement of the annulus 98 and carrier 74 in one direction or the other. The release collar 116 is connected to plungers 120 and 122 of oppositely acting, spring centered solenoids 124 and 126. Upon energization of solenoid 124, the release collar 116 is moved angularly in one direction to release the roller no-back means and permit angular movement of the carrier 74 in one direction, whereas upon energization of solenoid 126 the release collar 116 is moved in the opposite direction to release the roller no-back means and permit rotation of the planet carrier 74 in the opposite direction. When both solenoids 124 and 126 are deenergized, the release collar 116 is automatically centered thereby precluding movement of the planet carrier 74 in both directions.

A similar roller no-back double acting brake 128 is operatively associated with the planet carrier 84, one of the solenoids 130 being depicted in the drawing. The control system for energizing the four solenoids which control the two roller no-back means may be such as to permit individual or simultaneous energization of one solenoid associated with each no-back means whereby the output shafts 36 and 38 can be adjusted individually or simultaneously.

The electric motor 24 is operated continuously to rotate the input shaft 30. Rotation of the input shaft 30 imparts rotation to the spaced sun gears 62 and 64 which in turn rotate the planet gears 66 and 68 about the axes of their support shafts. During each revolution of each planet gear, turning moments, or torque impulses, in opposite directions are imposed on their respective planet carriers due to the eccentric mass of each planet gear. As long as the roller no-backs are engaged to preclude movement of the planet carriers in both directions, the planet carriers 74 and 84 remain stationary as will the output shafts 36 and 38. However, when either of the solenoids associated with each roller no-back is energized, the roller no-back will be released to permit movement of its respective planet gear in one direction whereby the rapid succession of torque impulses produced by rotation of the eccentrically weighted planet gears will result in angular movement of the planet carriers in one direction.

Substantial torque multiplication is achieved in the improved power transmitting mechanism thereby permitting the use of a relatively small continuously energized motor for actuating the aerodynamic control surfaces of a missile. Moreover, the control is instantaneous in nature in that the torque impulses in opposite directions are continuously produced by rotation of the planet gears, and as soon as either of the solenoids of either roller no-back means is energized, the desired torque impulses in one direction impart angular movement to the planet carrier which, in turn, rotates its respective output shaft through its drive pin.

While the embodiment of the invention as herein disclosed constitutes a preferred form, it is to be understood that other forms might be adopted.

What is claimed is as follows:

1. In a power transmitting device, a housing, a rotary driving member journalled in said housing, a pair of output shafts journalled in said housing and arranged at right angles to each other and to said driving member, spaced sets of eccentrically weighted gears drivingly connected to said driving member so as to be rotated thereby, spaced carriers supporting said sets of eccentrically weighted gears whereby rotation of said spaced sets of eccentrically weighted gears will produce torque impules in opposite directions during rotation thereof, means journalling said spaced carriers in said housing, means drivingly connecting each carrier with one of said output shafts, bidirectional roller no-back means engageable with each carrier for permitting rotation thereof in either of, but not both, directions at any one time, and means for selectively releasing said no-back means to permit movement of each carrier in one direction while presenting rotation thereof in the opposite direction.

2. In a power transmitting device, a cylindrical housing, a rotary input shaft coaxially disposed within said housing and journalled for rotation therein, a pair of crossed output shafts journalled in said housing, a pair of spaced sun gears attached to said input shaft on opposite sides of said output shafts, a plurality of eccentrically weighted planet pinions engaging each sun gear, a carrier supporting each set of planet pinions whereby rotation of said input shaft will rotate said eccentrically weighted planet gears to produce torque impulses in opposite directions on said carrier, means drivingly connecting each carrier with one of said cross shafts, and means engageable with each carrier for permitting rotation thereof in one direction while precluding rotation thereof in the opposite direction.

3. The power transmitting device set forth in claim 2 wherein said cross shafts are tubular and have slotted walls, and wherein said input shaft extends through the slotted walls of said cross shafts.

4. The power transmitting device set forth in claim 2 wherein the means engageable with each carrier comprises a bidirectional roller no-back comprising an annulus attached to each carrier, a stationary cam co-axial with said annulus having a plurality of flats separated by a like number of arcuate surfaces, and a plurality of roller-lock mechanisms mounted on said flats.

5. The power transmitting mechanism set forth in claim 2 wherein the means drivingly connecting each carrier and one of said cross shafts comprises a drive pin having one end attached to its respective carrier and a roller on its other end engaging a slot in the side wall of one of said cross shafts.

6. Control mechanism for aerodynamic control surfaces of a missile including, a continuously operated electric motor, a cylindrical housing, an input shaft journalled in said housing and drivingly connected to said motor, a pair of crossed output shafts journalled in said housing for actuating said control surfaces, a pair of spaced sun gears drivingly connected to said input shaft on opposite sides of said cross shafts, spaced sets of eccentrically weighted planet gears engaging said sun gears, a carrier supporting each set of planet gears whereby rotation of said eccentrically weighted planet gears will produce torque impulses in opposite directions, which torque impulses are transmitted to said carriers, means drivingly connecting each carrier to one of said cross shafts, brake means engageable with each carrier and having three positions, the first of which precludes rotation of the carrier in either direction, the second of which permits rotation of the carrier in one direction, and the third of which permits rotation of the carrier in the opposite direction, and means controlling said brake means.

7. The control mechanism set forth in claim 6 wherein said brake means comprise a bidirectional roller no-back comprising an annulus attached to each carrier a stationary cam coaxial with said annulus having a plurality of flats separated by a like number of arcuate surfaces, and a plurality of roller-lock mechanisms mounted on said flats.

8. The control means set forth in claim 7 wherein the means for releasing each bidirectional roller no-back comprises a release collar having a plurality of axially extending fingers disposed between the arcuate surfaces on its respective cam and annulus and movable in opposite directions to selectively release said roller-lock mechanisms to permit rotation of its respective annulus and carrier in either direction, and a pair of oppositely acting solenoids connected to said release collar for effecting movement thereof in opposite directions.

References Cited in the file of this patent

UNITED STATES PATENTS

| | | |
|---|---|---|
| 1,689,024 | Hamilton et al. | Oct. 23, 1928 |
| 1,718,073 | Reece et al. | June 18, 1929 |
| 1,718,074 | Reece et al. | June 18, 1929 |
| 1,787,768 | Wildhaber | Jan. 6, 1931 |
| 1,835,675 | Smith et al. | Dec. 8, 1931 |
| 1,972,484 | Hobbs | Sept. 4, 1934 |
| 2,007,442 | Dodge | July 9, 1935 |
| 2,134,420 | Smith | Oct. 25, 1938 |

FOREIGN PATENTS

| | | |
|---|---|---|
| 432,908 | France | Oct. 16, 1911 |
| 263,311 | Germany | Aug. 6, 1913 |